(No Model.)
G. JAQUITH.
SPINDLE FOR SPINNING MACHINES.
No. 264,297. Patented Sept. 12, 1882.
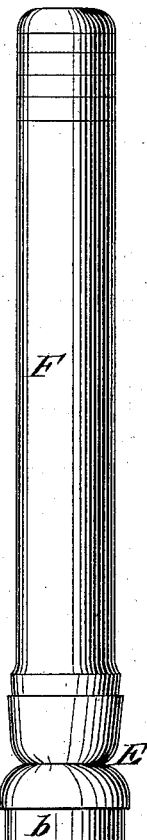
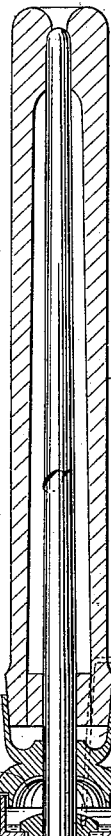
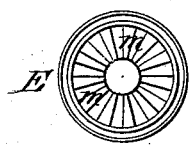
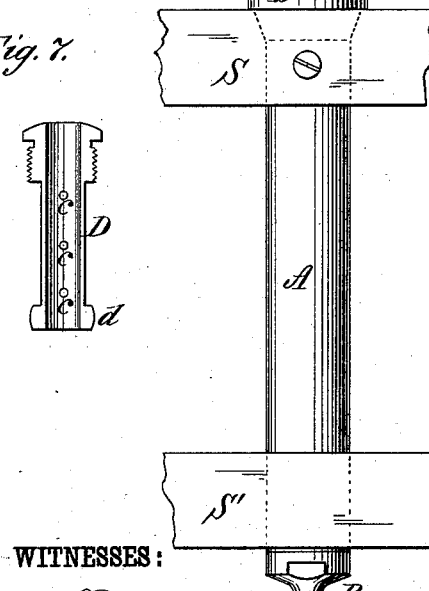
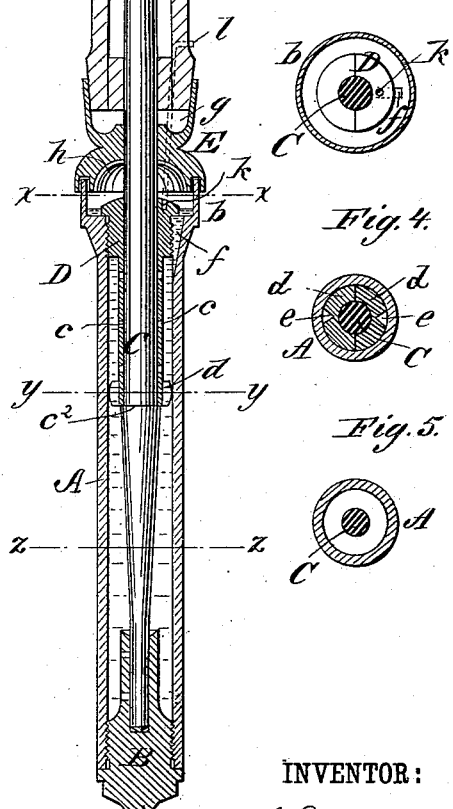
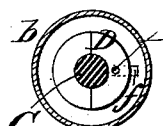
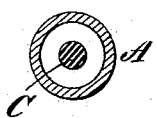
WITNESSES:
Dan Twitchell
C. Sedgwick
INVENTOR:
G. Jaquith
BY Munn & Co
ATTORNEYS.
N. PETERS, Photo-Lithographer, Washington, D. C.

UNITED STATES PATENT OFFICE.

GILMAN JAQUITH, OF MAYSVILLE, KENTUCKY, ASSIGNOR TO HIMSELF AND JANUARY & WOOD, OF SAME PLACE.

SPINDLE FOR SPINNING-MACHINES.

SPECIFICATION forming part of Letters Patent No. 264,297, dated September 12, 1882.

Application filed March 22, 1882. (No model.)

*To all whom it may concern:*

Be it known that I, GILMAN JAQUITH, of Maysville, in the county of Mason and State of Kentucky, have invented certain new and useful Improvements in Spindles for Spinning-Machines, of which the following is a full, clear, and exact description.

This invention more particularly relates to spindles; and it consists in various novel constructions and combinations of parts.

The invention also includes a whirl of peculiar construction and various other details and combinations of details, whereby waste of oil is avoided, the spindle is wholly inclosed and lint or dust excluded from it and from mixing with the oil, the whirl is made to form a friction driving spool-holder, and numerous other advantages are obtained.

Reference is to be had to the accompanying drawings, forming part of this specification, in which similar letters of reference indicate corresponding parts in all the figures.

Figure 1 represents an elevation of an outer tube, whirl, and bobbin, within which the spindle proper is inclosed, the whole representing what may be generally termed the "spindle," which is here shown as applied to the upper and lower rails of a spinning-frame. Fig. 2 is a longitudinal vertical section of the same. Fig. 3 is a transverse section on the line $x\ x$ in Fig. 2. Figs. 4 and 5 are sections drawn upon lines run through Fig. 2, the former through lines $y\ y$ and the latter through lines $z\ z$. Fig. 6 is an under view of the whirl, and Fig. 7 a longitudinal view of one-half of a bushing used within the tube in which the lower portion of the spindle proper is inclosed.

In the drawings, A indicates a tube arranged to extend through the rails S S' of the spindle-frame, and with its top, which projects above the upper rail, enlarged to form a cup, $b$. Screwed into the lower end of this tube A is a step-bearing, B, for the spindle C, said bearing closing with a shoulder-joint against the bottom end of the tube A, with which it makes a tight fit to prevent oil from passing out of said tube.

D is a bushing, made with an enlarged upper portion or head, which screws into the upper end of the tube A and rests with a collar bearing on the top of said tube, at the base of the cup $b$. Said bushing is also made in two longitudinal sections or halves, having perforations $c$ for supply of oil from the tube through them to the spindle, and with a lower collar, $d$, for steadying the bushing within the tube. This collar $d$ has one or more passages, $e$, in it for circulation of the oil, and rests upon a shoulder, $c^2$, formed on the spindle, to prevent the spindle pulling out when being doffed. A passage, $f$, is also formed in the tube A, on one side of the head of the bushing, for establishing a circulation of oil between the cup $b$ and the tube A, which tube is of sufficient capacity to keep up a free supply of oil to the spindle.

The spindle C, which rests at its lower end in the step-bearing B, is supported in its upright position by the bushing D.

E represents the whirl on the spindle for driving it, and F is the bobbin fitted over the upper portion of the spindle. The whirl E is constructed to form two reverse cups, $g$ and $h$, the lower one, $h$, the latter, of which is inverted. The upper cup, $g$, constitutes a taper socket to receive within it the lower taper end of the bobbin, and also to form an oil-cup below the bobbin, which, by its entry within the cup $g$, is driven through friction by said cup or socket $g$. The lower or inverted cup, $h$, is constructed to form a free annular tongue-and-groove joint with the upper edge of the stationary cup $b$ on top of the tube, to prevent oil from passing out from the tube and its cup, within which the spindle rotates. A hole is made through the whirl, which passage is continued, as shown at $k$, into the top of the bushing. This hole serves a double purpose—viz., to form a feed-aperture for the oil from the exterior to the cup $b$, and from thence down into the reservoir or body of the tube A, and to admit of the insertion of a key or wire, $l$, into the head of the bushing D, to form a handle for holding onto said bushing when it is necessary to unscrew or remove it by reversing the motion of the spindle. The tube A, which may pass through either one or two rails, S S', does not, it will be observed, come in contact with the spindle C to form a bearing thereto; but it forms an enlarged oil-reservoir and serves to hold the step-bearing B and bushing D, which support the spindle, and are not themselves supported by or brought in contact with the rails.

The cup $b$, which sits on top of the upper rail, S, forms, in conjunction with the inverted cup $h$ on the under side of the whirl, a chamber to prevent the possibility of escape of any oil, and also to shut out all lint, dust, or foreign substances which the oil could be absorbed by or become mixed with, and so choke the running of the spindle.

By the hereinbefore-described manner in which the bushing D is fitted within the tube, it, as well as the spindle, (by the shoulder $c^2$ on the spindle below it,) is prevented from being pulled out when doffing bobbins off the spindle, and the construction of the body of the bushing, being of a reduced diameter between its upper and lower ends, which fit the tube, leaves a space around the bushing for a free circulation of oil, which oil finds ready access to the spindle, the perforations in the bushing assisting, and so that the spindle swims, as it were, in oil.

By the concave construction of the under side of the whirl E the oil which is thrown up by the motion of the spindle is received on its concavity, and thus caused to flow down into the cup $b$ toward the spindle as a center. This concavity or inverted cup $h$ of the whirl has radial or other suitably-shaped grooves $m$ formed in it, as shown in Fig. 6, whereby the regular flow of the oil is broken, and as the oil accumulates in small quantities thereon, it is more readily thrown off than if the flow were unbroken. The dishing of the upper side of the whirl not only serves to receive within it the lower end of the bobbin, and to make said whirl a friction driving holder of the bobbin, but to form an oil-cup, $g$, for oil to pass into the cup $b$ through the hole which receives, when required, the key or wire $l$, and from which cup the oil passes, by the continuation of said hole, down into the fixed cup $b$, and from thence on down into the reservoir-chamber of the tube A through the aperture $f$.

The advantages of this invention are a great saving of oil, also of labor in cleaning, oiling, and keeping the spindles in good running order, less wear and tear of the parts, reduced liability to breakage of yarn ends, less waste, and a reduced number of bad places in the thread. Another advantage is, that as the spindle always runs in oil, there will invariably be a sufficient amount of oil between the spindle and the bearing to form an elastic cushion, which will serve to destroy tremble or jar, and convey an easier motion to the traveler, and consequently an easier and more uniform tension of the thread, thereby reducing the liability to breakage of the thread.

Having thus fully described my invention, I claim as new and desire to secure by Letters Patent—

1. The whirl E, constructed with upper and lower reverse cups, $g$ $h$, provided with an oil-passage connecting the two cups, substantially as described.

2. The combination, with a whirl, E, having an oil-passage therethrough, of the screw-headed bushing D, having a hole, $k$, and the tube A, having a passage, $f$, between it and the head of the bushing, as and for the purpose described.

3. The bushing D, constructed with a screw-threaded head on its upper end, enlarged lower portion, $d$, and a reduced perforated waist or body, substantially as and for the purposes specified.

GILMAN JAQUITH.

Witnesses:
A. M. J. COCHRAN,
C. S. WOOD.